Figure 7:
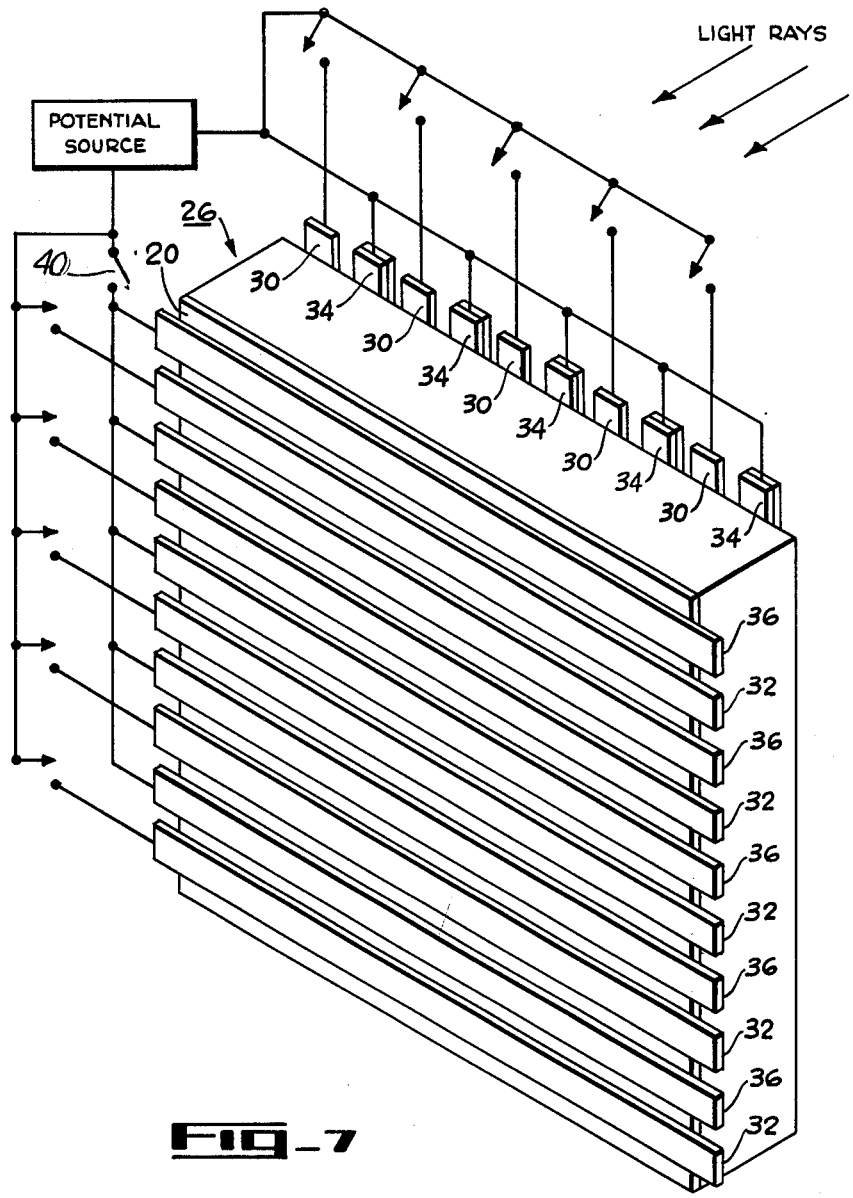

March 2, 1965 J. T. McNANEY 3,171,965
DISPLAY SCREEN FOR PRESENTING A BACKGROUND LIGHT PATTERN
IN COMBINATION WITH OTHER VISUAL DATA
Filed July 5, 1960 4 Sheets-Sheet 1
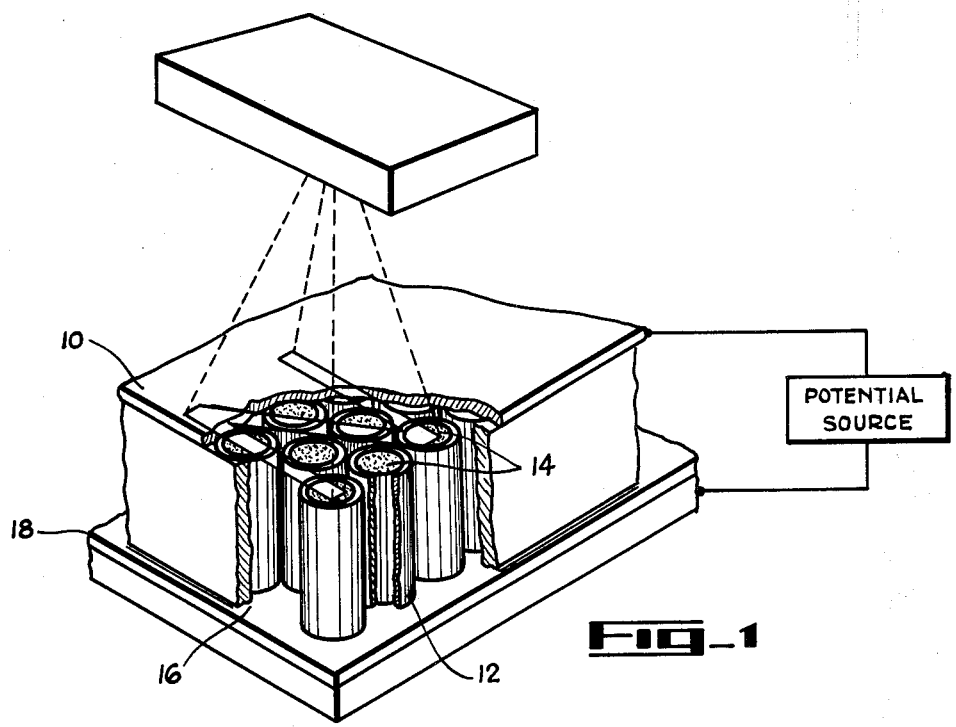
FIG_1
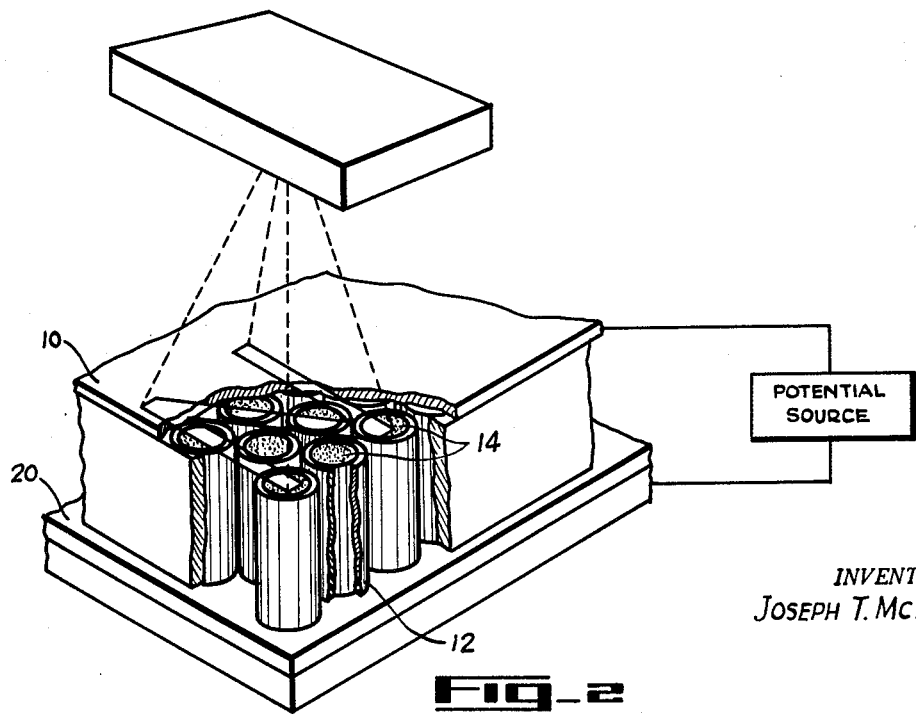
FIG_2
INVENTOR.
JOSEPH T. McNANEY.

March 2, 1965 J. T. McNANEY 3,171,965
DISPLAY SCREEN FOR PRESENTING A BACKGROUND LIGHT PATTERN
IN COMBINATION WITH OTHER VISUAL DATA
Filed July 5, 1960 4 Sheets-Sheet 2
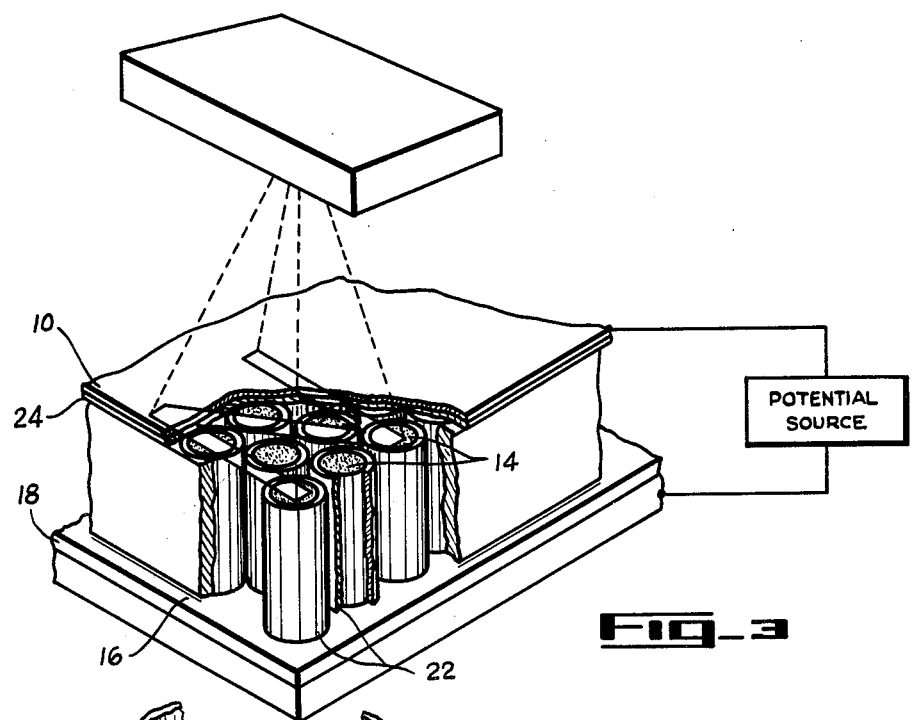
Fig_3
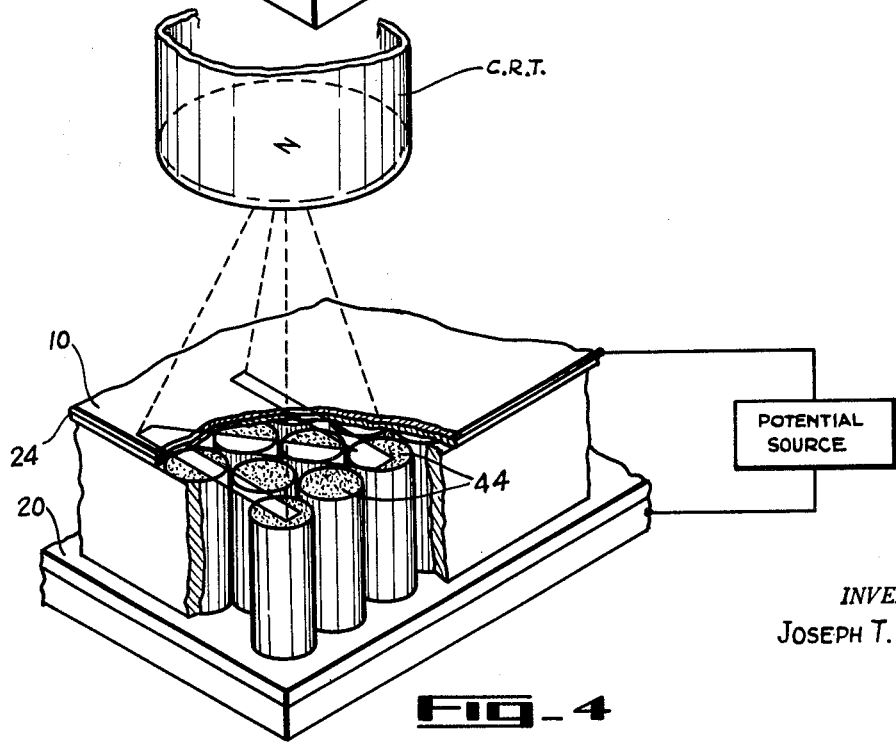
Fig_4
INVENTOR.
JOSEPH T. McNANEY.

March 2, 1965    J. T. McNANEY    3,171,965
DISPLAY SCREEN FOR PRESENTING A BACKGROUND LIGHT PATTERN
IN COMBINATION WITH OTHER VISUAL DATA
Filed July 5, 1960    4 Sheets-Sheet 3
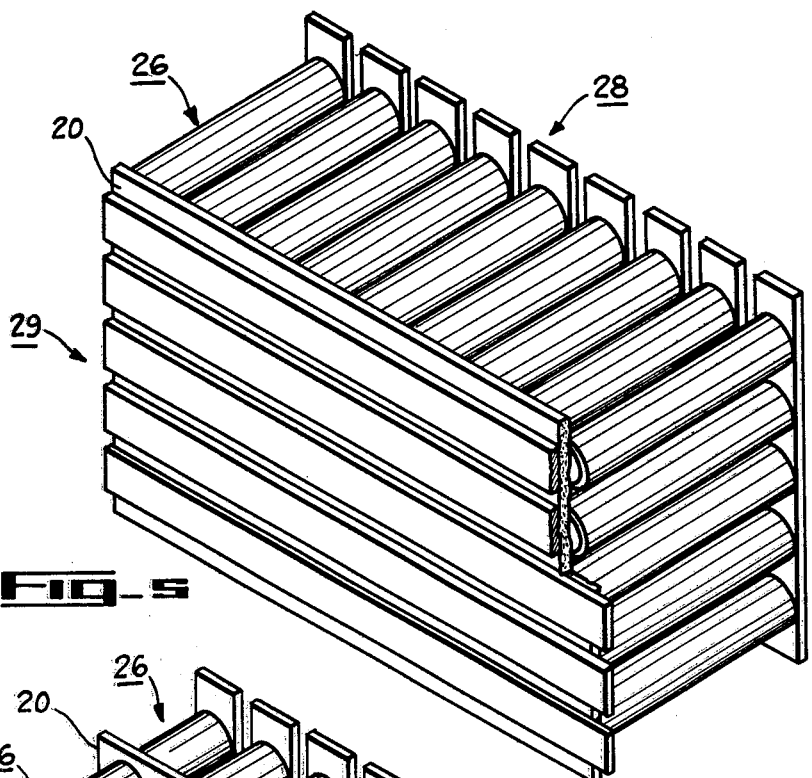
FIG_5
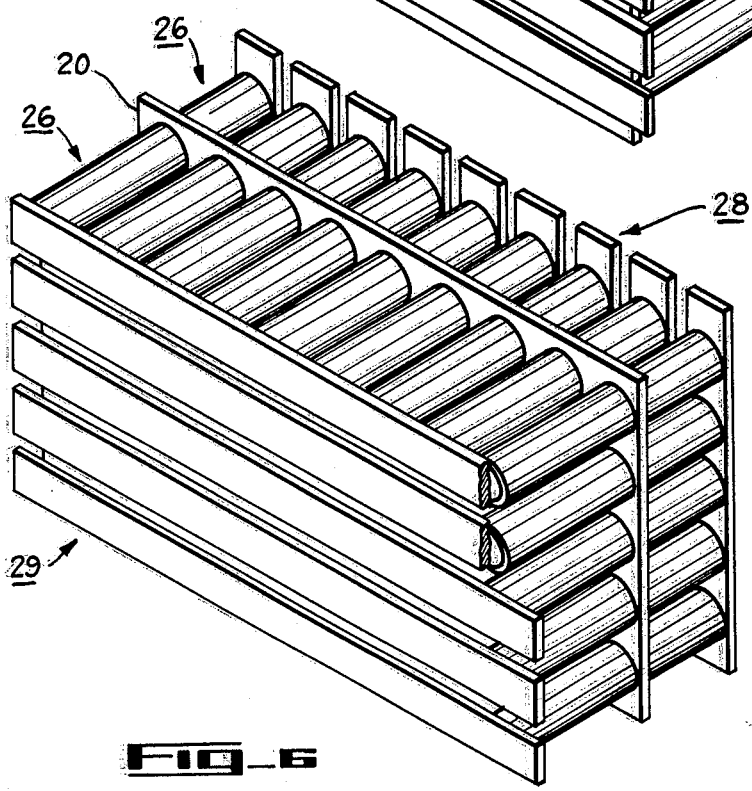
FIG_6
INVENTOR.
JOSEPH T. McNANEY.

United States Patent Office 3,171,965
Patented Mar. 2, 1965

3,171,965
DISPLAY SCREEN FOR PRESENTING A BACK-
GROUND LIGHT PATTERN IN COMBINA-
TION WITH OTHER VISUAL DATA
Joseph T. McNaney, La Mesa, Calif., assignor to General
Dynamics Corporation, Rochester, N.Y., a corporation
of Delaware
Filed July 5, 1960, Ser. No. 40,795
1 Claim. (Cl. 250—227)

This application is an improvement of my copending applications entitled "Apparatus for Generating Electrostatic Images," Serial No. 799,016, filed March 12, 1959, now U.S. Patent No. 3,007,049; and "Image Storage Apparatus," Serial No. 798,983, filed March 12, 1959, now U.S. Patent No. 2,976,447.

Each of the above applications is based upon the use of a light guide whose surface is coated with a circumjacent sleeve of photoconductive material. As shown in FIGURE 1, an optical image—which may be visible, infra-red, or ultra-violet—is projected onto a transparent, electrically conductive layer 10 that is in electrical contact with one end of the sleeves 12 of photoconductive material. Radiations from the image enter selected light guides 14, and are transmitted to their other ends by multiple internal reflections. Some of the radiation escapes from the light guide at each reflection, and the escaped radiation irradiates the associated photoconductive sleeve. Since the sleeves have a low electrical resistance when irradiated, the potential applied to electrode 10 is transmitted by the irradiated, low-resistance sleeves to the lower ends thereof.

In the first cited copending application, the potential is impressed across an air gap 16 which contains a recording medium 18. As is well known in the field of electrographic printing, an electrical discharge results; producing an electrical recordation on recording medium 18. This is later treated to produce a visible display.

The second of the above cited copending applications uses a similar photoconductor-clad light guide in the structure shown in FIGURE 2. Here the radiation is imaged onto the transparent conductive layer 10 as described previously, and as a result selected photoconductive sleeves 12 are illuminated, and have their electrical resistance reduced.

In the structure of FIGURE 2, however, the potential is not applied across an air gap; but instead is applied across an electroluminescent material 20, which glows where a potential is applied across it. The resultant potential pattern therefore produces a plurality of glowing spots, which form a lighted pattern that corresponds to the image. The lighted pattern may be brighter than the image, or may be visible—whereas, the image might have been invisible. Light from the glowing spots enters the distal ends of the light guides associated with the irradiated sleeves, and the resultant internal reflections maintain the photoconductive sleeves in their illuminated state. Since in this state the sleeves 12 have a low electrical resistance, the potential continues to be applied across selected areas of the electroluminescent layer. In this way "optical feedback" causes the structure to maintain the lighted pattern, even after the original irradiation is removed.

The advantage of the above structures lies in the fact that light guides of extremely small diameter are available. These diameters may be as small as .002 of an inch, and the light guides are then called "optical fibers." This means that a lineal inch may have as many as 500 discrete spots of light; and a display made in this way can therefore have an extremely good resolution. Furthermore, the light from each glowing spot tends to be restricted to its associated optical fiber; in this way preventing "blooming" of the spot of light.

For some uses, it may not be desirable to incur the expense of using photoconductor-clad optical fibers.

It is therefore an object of this invention to provide an improved potential-applying structure. The attainment of this object and others will be realized from the following specification, taken in conjunction with the drawings in which:

FIGURES 1 and 2 illustrate structures used in the parent cases;
FIGURE 3 shows my basic inventive concept;
FIGURE 4 shows another embodiment thereof; and
FIGURES 5 to 7 show further embodiments.

In FIGURE 3, the optical fibers are shown as having sleeves 22 of electrically conductive material, rather than of photoconductive material—and are spaced apart. An insulating spacing material may be used. As in previous illustrations, this embodiment also has the top of the structure covered with a layer of transparent electrically conductive material 10, which now has a contiguous coating of photoconductive material 24. An image is projected as previously described, and selected areas of photoconductive coating 24 become conductive. As a result, the potential is applied through the conductive areas to the ends of respective conductive sleeves adjacent thereto; and the potential appears at the distal ends of said conductive sleeves. From here the potential appears across air gap 16, and produces an electrical recordation as discussed in connection with FIGURE 1.

FIGURE 4 shows another embodiment of my invention. This is similar to that of FIGURE 2; except that the image originates at a cathode ray tube, and the optical fibers 44 are made of electrically conductive glass or plastic. Materials of this sort are available under the trade name of N.E.S.A., E.C., Tin Oxide, etc. In FIGURE 4 the fibers are spaced apart, or have an insulating circumjacent sleeve. As shown, the potential appears across a layer of electroluminescent material 20. As previously explained, the potential causes spots of light, and the light is transmitted back through associated optical fibers. The optical feedback maintains the selected areas of the photoconductive layer in an illuminated state, and therefore in its low state of electrical resistance; thus maintaining the lighted pattern.

Whereas the embodiments of FIGURES 1–4 are of the type that are energized by impinging light, FIGURES 5 and 6 show embodiments of my invention that are energized by electrical signals. As has been described previously, it may be desirable to avoid the expense of using photoconductor-clad optical fibers. Moreover, as incident light strikes the photoconductors of the prior art, the electroluminescent layer will be rendered visible in an area substantially equal to the area of the excited portion of the photoconductor. Some of the radiation from the electroluminescent layer reaches the photoconductor in areas not originally excited and causes the conductive area of the photoconductor to increase. This, in turn, increases the electroluminescent emitting area. This image spreading may continue until the image quality is either blurred or completely destroyed. The device of FIGURE 5 comprises a structure 26 of conductive light fibers, which as previously defined may be conductive or have sleeves of conductive material on the surfaces thereof. A set 28 of vertically oriented grids is in electrical contact with one end of the conductive optical fibers, and a layer 20 of electroluminescent material is adjacent the other ends of the conductive optical fibers. A set 29 of horizontal grids is positioned contiguously with the electroluminescent material, opposite the other ends of the conductive optical fibers. Of course, the terms "vertical" and "horizontal" are merely exemplary to indicate the relation between the two sets. The grids of the various sets may be energized by any well known commutator arrangement. When a potential is applied to selected grids of the two sets, the conductive characteristic of the optical fiber between these selected grids applies a potential across a small area of the electroluminescent material. This material therefore glows as previously described. Thus, the structure shown in FIGURE 5 can be electrically energized to produce extremely small spots of light that are separate and distinct from each other, and do not enlarge.

In FIGURE 6 there is shown another embodiment, wherein the electroluminescent material 20 is positioned between two optical fiber structures 26, rather than being at one end of one. This embodiment, of course, comprises conductive optical fibers, and operates in the same manner as previously described. If either or both sets of grids are transparent, the display can be seen from one or two directions.

In the embodiment of FIGURE 7, light energized and electrically energized elements are combined into one composite structure, which comprises a conductive optical fiber structure 26 of the type previously described. The vertically oriented grids 30 cooperate with the horizontally oriented grids 32 so that they may be electrically energized by selected switches to cause electroluminescent material 20 to produce spots of light.

The vertically oriented grids 34 comprise a transparent, electrically conductive layer and a layer of photoconductive material, as discussed in connection with FIGURES 3 and 4. These grids are energized by incoming light rays, and coact with horizontal grids 36 in the manner previously described. When the photoconductor layers 34 are exposed selectively to light rays, the voltage reaching the electroluminescent layer 20 between energized conductors 22 of fibers 14 (see FIGURE 3) and conductor strips 32 cause the electroluminescent layer 20 to illuminate. Light from the electroluminescent layer 20 is returned to the photoconductor 34, causing a continuing glow from layer 20 until a switch 40 is opened to break the circuit. The advantage of this embodiment is that it can produce a background light pattern such as a map or a chart. Onto this can be incorporated an electrically drawn display such as may be produced by a computer, a Charactron Cathode Ray Tube, or a radar system. The composite display would then be of the "dot-interlaced" type.

The particular embodiment of the invention illustrated and described herein is illustrative only and the invention includes such other modifications and equivalents as may readily appear to those skilled in the art, within the scope of the appended claim.

I claim:

The combination comprising: a plurality of electrically conductive light guides positioned in the form of rows and columns; a first set of grids, individual said grids oriented to contact the ends of selected said columns of said guides; a layer of electroluminescent material positioned on the other ends of said guides; a second set of grids positioned on said layer and oriented along selected rows of said guides—whereby a potential applied to selected said grids of said sets causes the electroluminescent material adjacent associated guides to emit light; a third set of grids, individual said grids oriented to contact the ends of other selected said columns of said guides, said third set of grids comprising a film of transparent conductive material and a coating of photoconductive material—whereby light causes selected said grids to contact selected said guides; and a fourth set of grids positioned on said layer and oriented along other selected rows of said guides—whereby a potential applied to selected said grids of said third and fourth sets causes the electroluminescent material adjacent associated guides to emit light.

References Cited in the file of this patent

UNITED STATES PATENTS

| 2,773,992 | Ullery | Dec. 11, 1956 |
| 2,907,001 | Loebner | Sept. 29, 1959 |
| 2,932,770 | Livingston | Apr. 12, 1960 |
| 2,996,623 | Koury | Aug. 15, 1961 |
| 2,999,941 | Klasens et al. | Sept. 12, 1961 |
| 3,001,078 | Rulon | Sept. 19, 1961 |
| 3,065,353 | Sharek | Nov. 20, 1962 |
| 3,070,701 | Wasserman | Dec. 25, 1962 |

OTHER REFERENCES

Schwartz: "Electroluminescence X-Ray Intensifier," RCA Technical Notes No. 315, November 1959. (Sheet 1 relied on.)